United States Patent
Gallo et al.

(10) Patent No.: US 7,530,101 B2
(45) Date of Patent: May 5, 2009

(54) METHOD AND SYSTEM FOR MANAGING NETWORK ACCESS DEVICE USING A SMART CARD

(75) Inventors: Paolo Gallo, Turin (IT); Ilario Gregori, Turin (IT); Simonetta Mangiabene, Turin (IT); Marco Polano, Turin (IT); Nicola Portinaro, Turin (IT)

(73) Assignees: Telecom Italia S.p.A., Milan (IT); Pirelli & C. S.p.A., Milan (IT)

(*) Notice: Subject to any disclaimer, the term of this patent is extended or adjusted under 35 U.S.C. 154(b) by 131 days.

(21) Appl. No.: 10/546,011

(22) PCT Filed: Feb. 21, 2003

(86) PCT No.: PCT/EP03/01790

§ 371 (c)(1),
(2), (4) Date: Aug. 18, 2005

(87) PCT Pub. No.: WO2004/075477

PCT Pub. Date: Sep. 2, 2004

(65) Prior Publication Data

US 2006/0101506 A1    May 11, 2006

(51) Int. Cl.
*G06F 9/00* (2006.01)
*H04L 9/32* (2006.01)
*G06F 15/16* (2006.01)

(52) U.S. Cl. ............ 726/12; 726/2; 726/3; 726/4; 726/5; 726/6; 713/151; 713/152; 713/153; 713/154; 709/225; 709/226; 709/227; 709/228; 709/229

(58) Field of Classification Search ............ 726/12
See application file for complete search history.

(56) References Cited

U.S. PATENT DOCUMENTS

| 4,910,774 A | 3/1990 | Barakat |
| 5,602,918 A | 2/1997 | Chen et al. |
| 2002/0104016 A1* | 8/2002 | Pan et al. ............ 713/201 |
| 2002/0184512 A1 | 12/2002 | Cardoso, Jr. |
| 2003/0204574 A1* | 10/2003 | Kupershmidt ........... 709/220 |

FOREIGN PATENT DOCUMENTS

| EP | 1 179 915 | 2/2002 |
| WO | WO 02/080515 | 10/2002 |

* cited by examiner

*Primary Examiner*—Longbit Chai
(74) *Attorney, Agent, or Firm*—Finnegan, Henderson, Farabow, Garrett & Dunner, L.L.P.

(57) ABSTRACT

A method of operating via a smart card an access gateway between a local area network and a wide area network under the control of a management system includes the steps of providing in the smart card at least a first memory area containing configuration data for access to the wide area network that cannot be modified by the user and a second memory area adapted for storing personalized configuration data of the user, and providing in the access gateway a third memory area and storing the contents of the second memory area of the smart card in the third memory area.

11 Claims, 8 Drawing Sheets

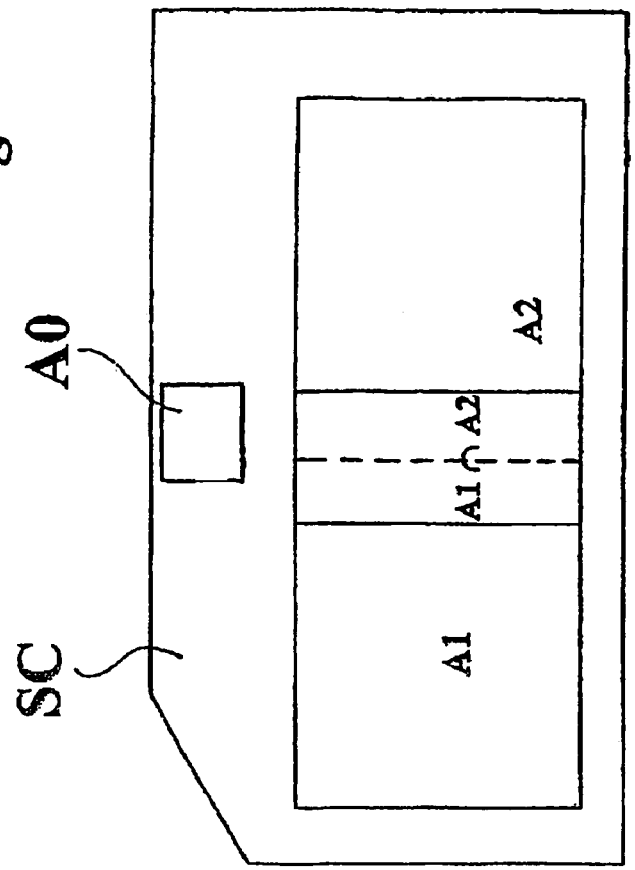
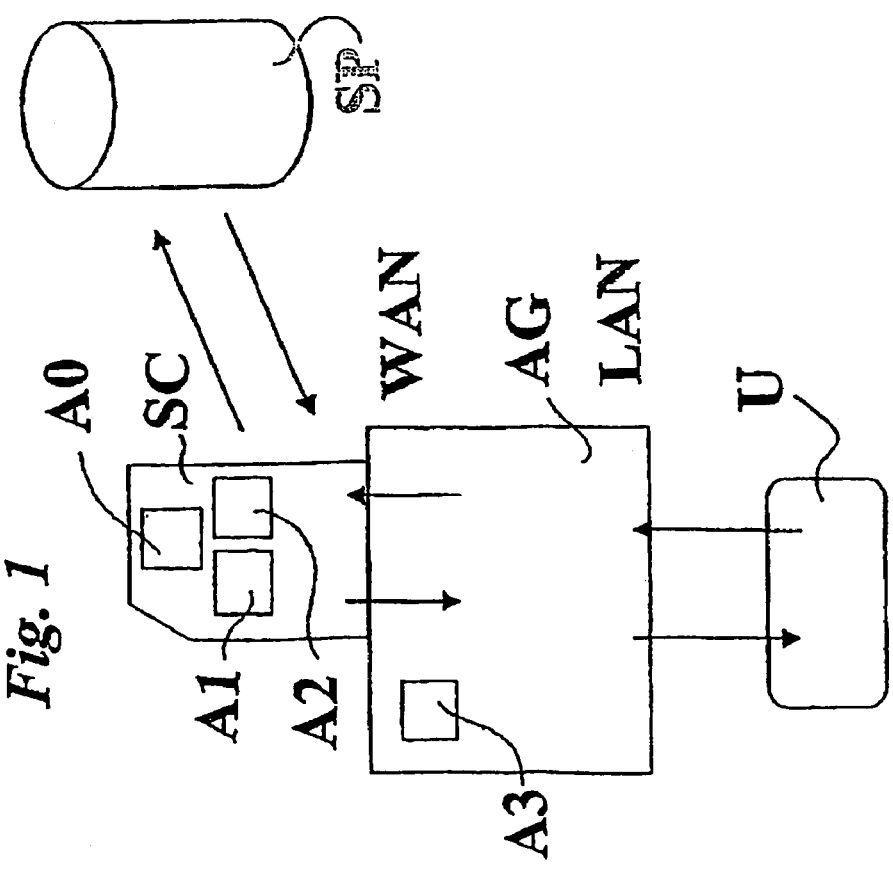

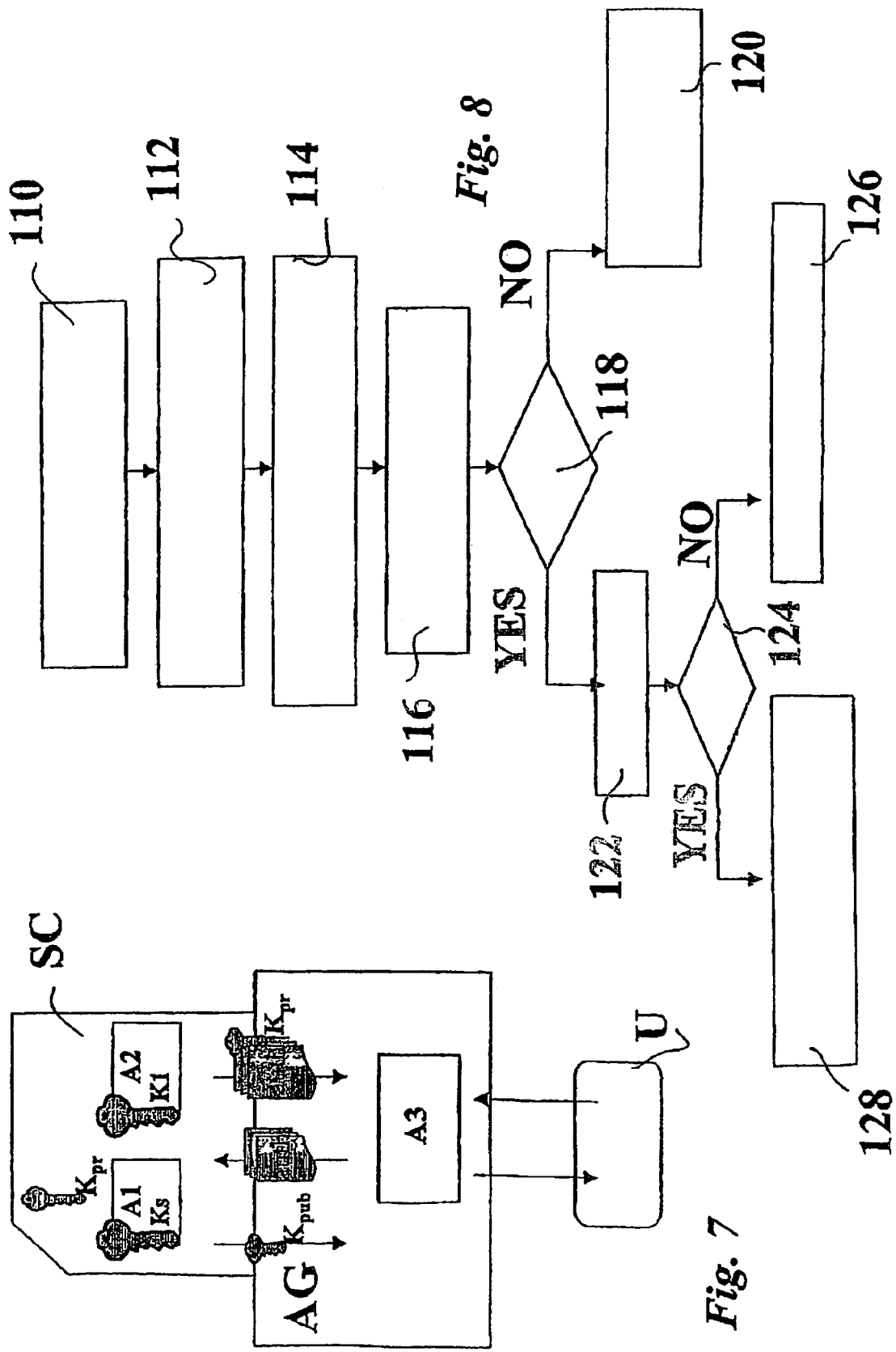

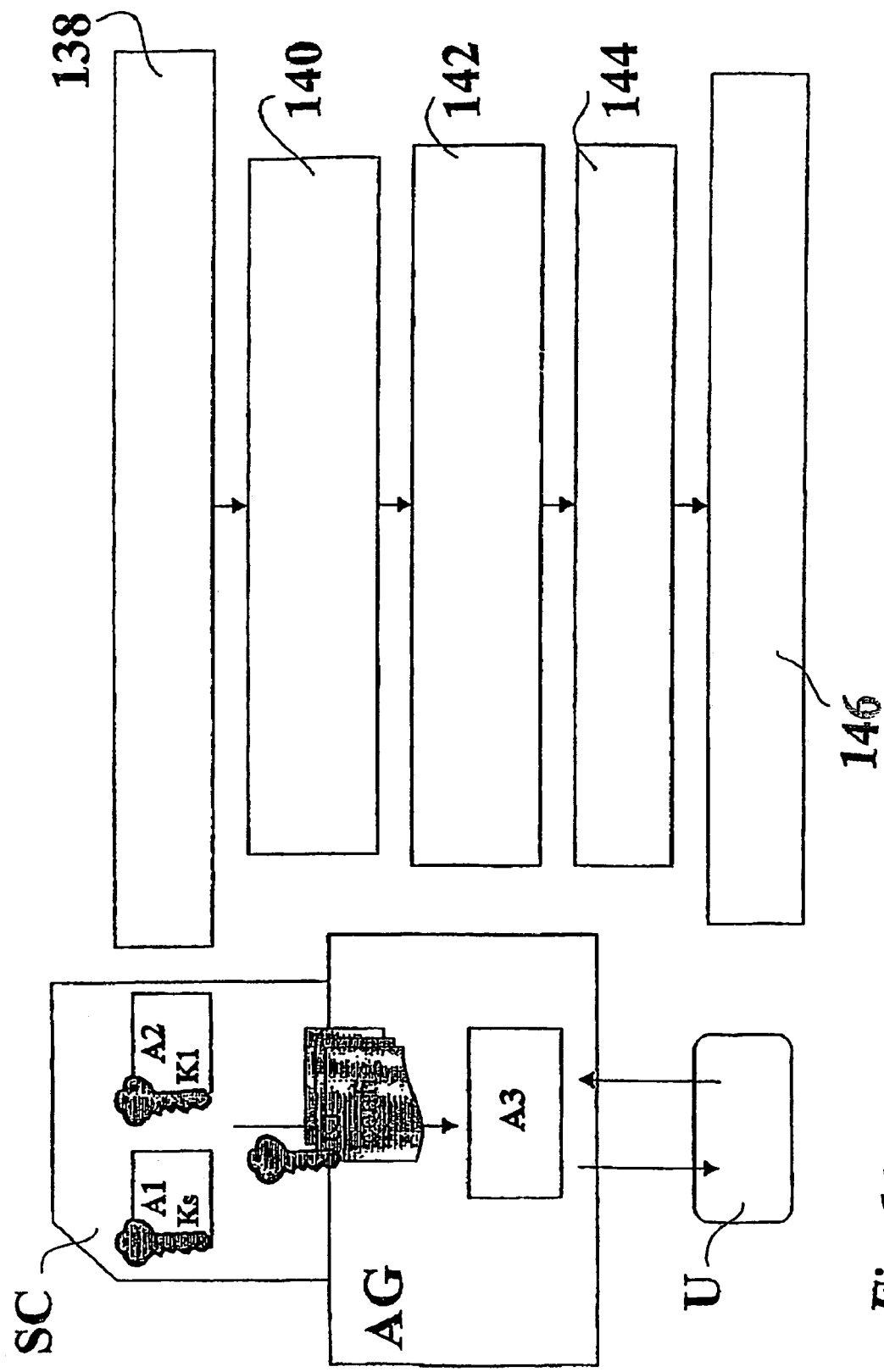

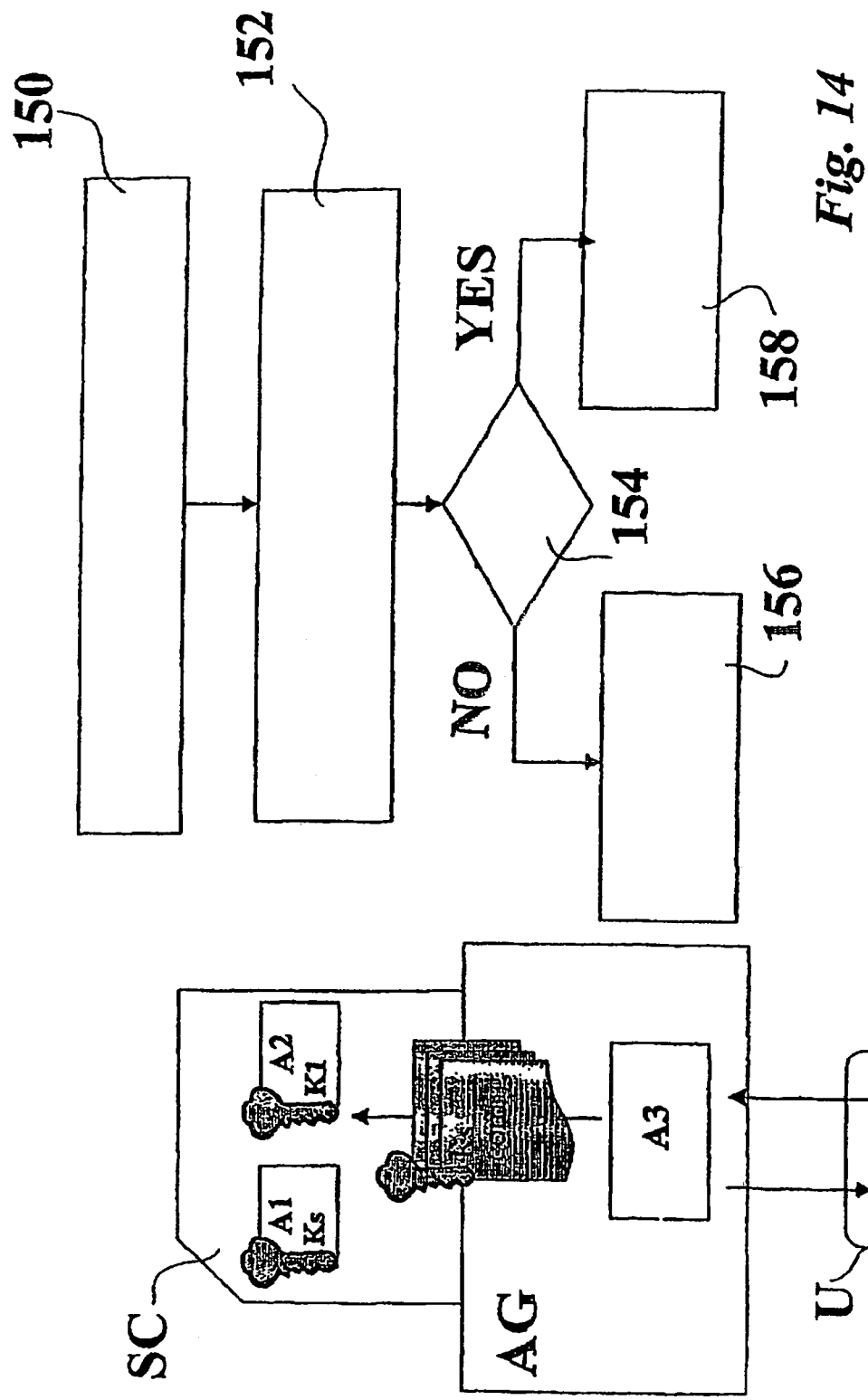

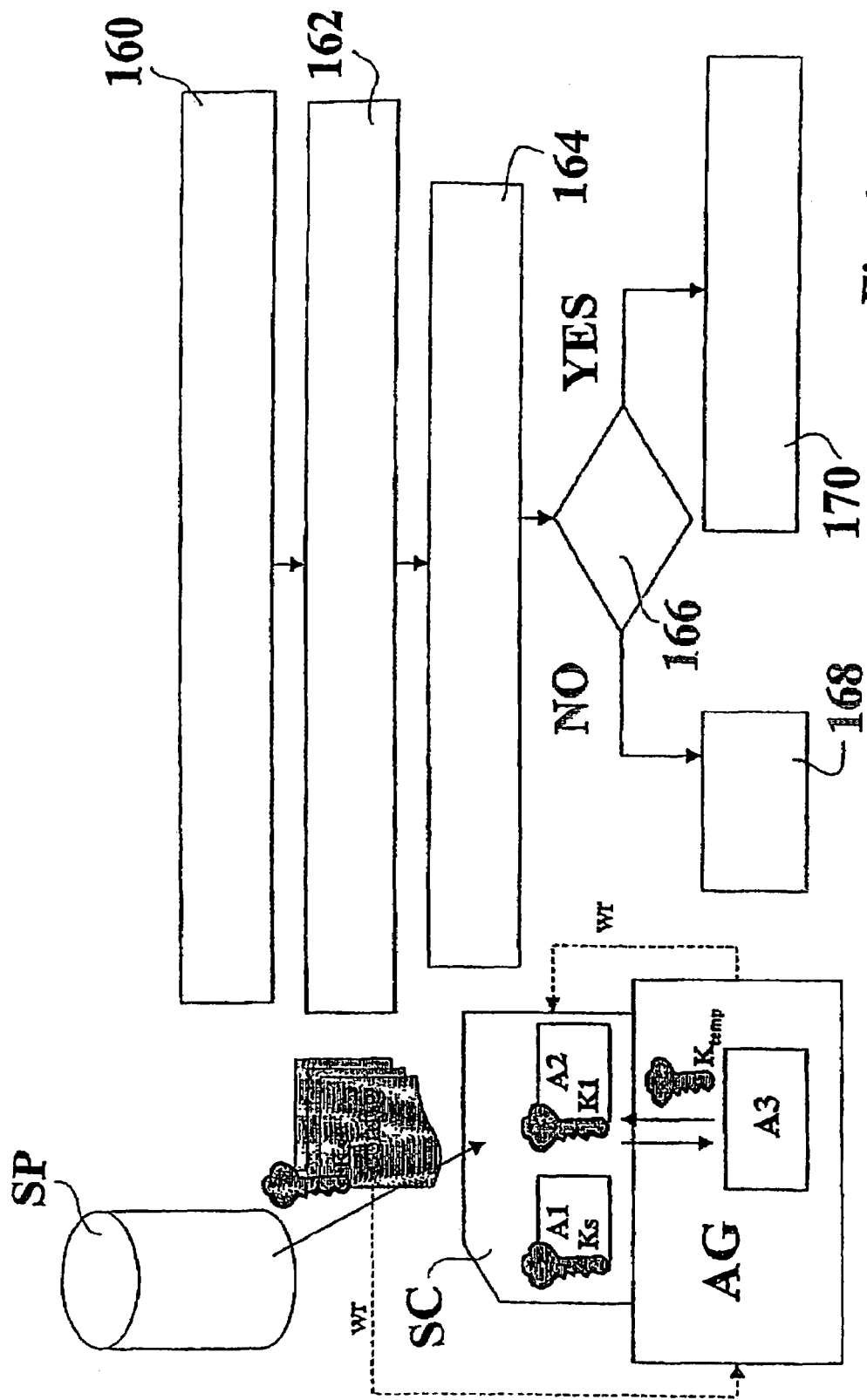

METHOD AND SYSTEM FOR MANAGING NETWORK ACCESS DEVICE USING A SMART CARD

CROSS REFERENCE TO RELATED APPLICATION

This application is a national phase application based on PCT/EP2003/001790, filed Feb. 21, 2003, the content of which is incorporated herein by reference.

BACKGROUND OF THE INVENTION

1. Field Of The Invention

The present invention relates to techniques for managing network access and was developed by paying particular attention to the possible use in access control and remote management of configuration data in access gateways permitting interaction between local area networks (LANs) and wide area networks (WANs) such us Internet. Specifically, the invention relates to techniques for operating by means of a smart card (SC) under the control of management system an access gateway between a local area network (LAN) and a wide area network (WAN).

2. Description Of The Related Art

Configuring and maintaining wideband network access apparatus such as so-called customer premise equipment or CPE may entail significant problems and corresponding costs for system providers, these being primarily related to the possible need of direct intervention by technical personnel with the clients' premises.

Self-installation and self-configuration tools may facilitate and reduce provisioning costs. However, these tools may not be adapted to properly take into account modifications, both deliberate and unintentional, that the client may introduce in the configuration of its access gateway. Moreover, in the case of a failure in the access gateway, the self-configuration tools are usually unable to permit the previous configuration to be completely restored. This applies primarily to those parameters that were personalized by the client (for instance specific configuration parameters related to the home network and the LAN interface).

Another problem has to be tackled by a system provider in managing access gateway configuration: while wishing to give the client the possibility of personalizing certain parameters (for instance the LAN interface configuration, the firewalling rules, and so on), the need exists of preventing undesired access and modifications to the parameters on the wide area network side, which may lead to the service profile being modified. This applies primarily to information such as User ID and password, in order to avoid fraudulent and/or unauthorized use (for instance on another access gateways or for other unqualified products).

From WO-A-02/080515 a system and method are known for configuring a network access equipment by utilizing a data storage card or a smart card in response to a request for service from a subscriber to a network application service provider. The system includes a card writer for writing configuration data from the application service provider to the card, and a card reader for downloading the configuration settings into the network access equipment from the card. The card may also include provisions for authentication and known-repudiation of service configurations received via a public key cryptography system.

In U.S. 2002/0104016A1 a network router is disclosed adapted for coupling a LAN to a WAN such as the Internet or an intranet. The router in question includes a smart card device for receiving and reading a smart card. The smart card includes information needed for permitting the router to access the Internet or intranet, such as an access phone number, an encryption key, configuration data and an ID and password. A specified security level can also be stored within the information on the smart card to restrict such access.

OBJECT AND SUMMARY OF THE INVENTION

Even though the prior art arrangements referred to in the foregoing do in fact tackle some of the problems likely to arise in the context considered, the need is still felt for an arrangement adapted for use in connection with an access gateway provided with a smart card reader/writer, that may simultaneously ensure:

- self-configuration and self-installation of the access gateway without any intervention by specialized personnel being required;
- protection of configuration data against unauthorized access;
- reliable saving of configuration data for complete restoration in the case of failure; and
- secure remote management of the access gateway by the service provider.

The object of the present invention is thus to provide an improved arrangement that meets the needs outlined in the foregoing.

According to the present invention, such an object is achieved by means of a method having the features set forth in the claims that follow. The invention also relates to a corresponding system as well as a smart card for use in the invention and a computer program product directly loadable in the memory of a digital computer and including software code portions performing the method of the invention when the product is run on a computer.

As used herein, the term "smart card" is intended to generally encompass any kind of data storage card having associated a data processing feature.

A presently preferred embodiment of the invention is thus comprised of a method of operating via a smart card (SC) an access gateway between a local area network (LAN) and a wide area network (WAN) under the control of management system (SP), including the steps of:

- providing in the smart card at least a first memory area containing configuration data for access to said wide area network, that cannot be modified by the user and a second memory area, adapted for storing personalized configuration data of the user, and
- providing in said access gateway a third memory area and storing the contents of said second memory area in said smart card in said third memory area.

Preferably, the arrangement of the invention includes the steps of:

- providing in said smart card a further storage area containing configuration data for access to said wide area network by a not yet initialised smart card, and
- disabling access to said further memory area once the respective smart card has been initialised.

Further preferably, the arrangement includes the steps of:

- enabling said management system to write and read data from both said first and said second memory area,
- enabling said user to read data from both said first and said second memory area, and
- enabling said user to write data into said second memory area, while subjecting the user to write lock with respect to said first memory area.

Preferably, both said management system and the user are entitled to read data from said further memory area, said management system being enabled to write data into said further memory area, while said user is subject to a write lock with respect to said further memory area.

All interactions between said management system and said smart card are preferably conveyed via said access gateway, and still preferably via firmware provided in said access gateway.

Preferably, a smart card is used as a physical medium for storing all the configuration parameters of the access gateway, including both the parameters set by the service provider and the parameters personalized by the client. Access data, such as user ID and password, cannot be read or modified by the client. Access and modification of data on the smart card is regulated by an asymmetric key system. The service provider and the client are thus assigned different read/write privileges and/or the authenticity of any entity that attempts writing on the smart card can be controlled. This fact, in combination with the network communication protocols, also permits a secure remote management.

Still preferably, the arrangement disclosed herein lies provides for the availability of specific tools for managing the smart card, authenticating and validating the data resident thereon, while interacting with the firmware run on the access gateway, while also self-configuring the access gateway, protecting the access data of the software provider, restoring the complete configuration in the case of failure, while ensuring secure remote management by the service provider.

BRIEF DESCRIPTION OF THE DRAWINGS

The invention will now describe, by way of example only, by referring to the annexed figures of drawing, wherein:

FIG. 1 is a general block diagram showing the context of use of an arrangement according to the invention, FIG. 2 shows various memory areas in a smart card for use in the invention, FIG. 7 is a schematic representation of how data are read from the smart card to the access gateway especially as regards the authentication phase of the smart card, FIG. 8 is a flow chart corresponding to the schematic representation of FIG. 7, FIG. 11 is another schematic representation of how data are read from a non-initialised smart card during a provisioning phase, FIG. 12 is a flow chart corresponding to the schematic representation of FIG. 11, FIG. 13 is a schematic representation of how data are written on a smart card by a user, FIG. 14 is a flow chart corresponding to the schematic representation of FIG. 13, FIG. 15 is a schematic representation of how data are written on the smart card by the system provider, and FIG. 16 is a flow chart corresponding to the schematic representation of FIG. 15.

DETAILED DESCRIPTION OF A PREFERRED EMBODIMENT OF THE INVENTION

Figure 3:
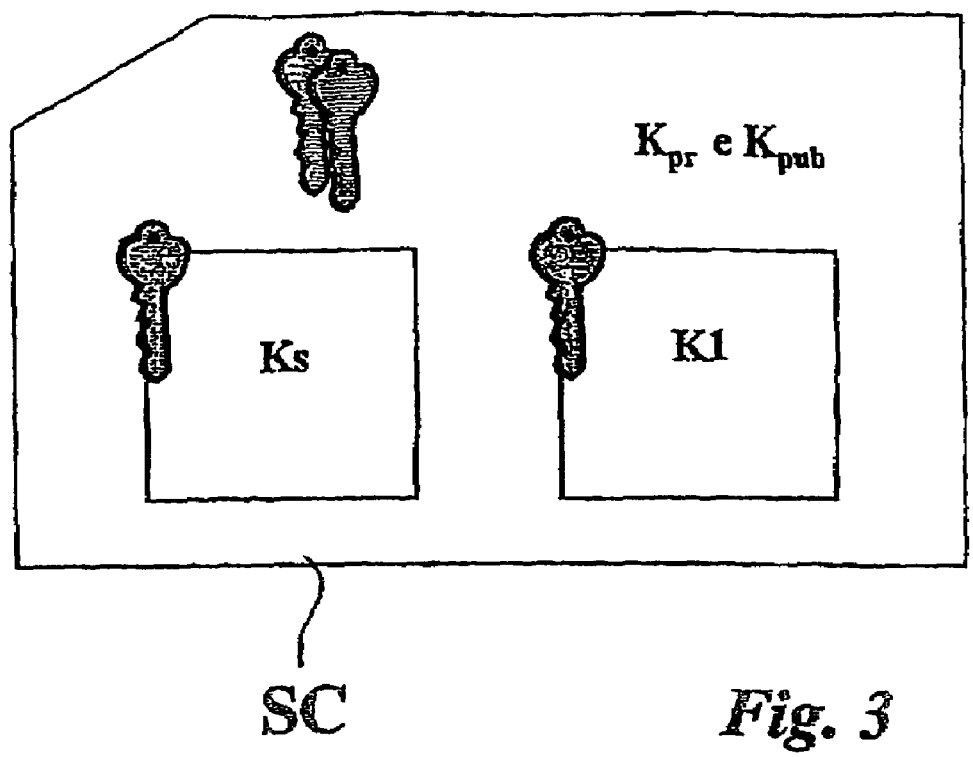
FIGS. 3 and 4 are schematic representations of the keys and the arrangement of the access codes adopted for the smart card of FIG. 2.

FIG. 1 is a schematic diagram of typical context of application of the invention.

In the diagram of FIG. 1, an access gateway AG is shown, that is intended to permit communication between the wide area network or WAN (such as the Internet or an intranet) and a local area network or LAN.

The criteria regulating co-operation of the WAN and the LAN via the gateway AG are generally known in the art; they do not represent—per se—specific subject matter of this application, thereby making it unnecessary to provide a detailed description herein.

Operation of the access gateway AG is dictated primarily by configuration data jointly provided, as better explained in the following, by:
  a managing system SP essentially hosted with a service provider, and
  a user U by means of a smart card SC.

The smart card SC made available to the user is adapted to be inserted in a smart card. reader/writer interface included in the access gateway AG. Such read/write interfaces are well known in the art, thereby making it unnecessary to provide a detailed description herein.

In the presently preferred embodiment of the arrangement shown herein, in the smart card SC three memory areas are provided, namely:
  a first area A1 for the running configuration,
  a second area A2 for the user configuration, and
  an additional area A0 for the start-up configuration.

The data present on the smart card SC can be modified by the management system SP on the basis of specific control and authentication procedure. The smart card interacts with the user U and the management system SP through the firmware running on the access gateway AG. The access gateway is characterized by the firmware FW version being run. Interaction with the smart card SC takes places via such a firmware.

In the access gateway AG a firmware memory area A3 is provided that is a copy of the area A2 present on the smart card.

The memory area A0 is intended to contain configuration data for WAN access to be used during a provisioning phase, that is when the smart card is not initialised. Access to this area is disabled once the smart card has been personalized.

Access privileges for the area AO are as follows:
  write/read for the management system SP,
  locked write/read for the user U.

The memory. area A1 on the smart card. SC includes those WAN access configuration data that cannot be modified by the user as well as certain Internet working parameters having default values.

At least some parameters present in the area designated A1 can also be present in the area designated A2, which has been denoted in FIG. 2 by the area designated A1∩A2.

Access privileges for the area A1 are essentially the same as those indicated for the area A0.

The memory area A2 includes the configuration data that are personalized by the user (for instance the LAN configuration). This area is copied in the area A3 present in the access gateway AG.

Access privileges for the area A2 are read/write for both the management system SP and the user U.

All the interactions of the management system SP with the smart card are conveyed through the access gateway AG or, more precisely, through the access gateway firmware.

As portrayed in the schematic representation of FIG. 3, a number of keys are resident. on the smart card SC.

These include:

a first asymmetric key $K_{pr}$ (private) and a second asymmetric key $K_{pub}$ (public) intended to be used by the access gateway AG for controlling and validating the smart card SC;

a first symmetric key $K_s$ for use by the management system SP in controlling and authenticating write functions in the memory area A1, and a second symmetric key $K_1$ for use in controlling and authenticating read functions from the smart card SC to the access gateway AG.

Even though both asymmetric keys $K_{pr}$ and $K_{pub}$ reside on the smart card SC, only the public key $K_{pub}$ can be read by the access gateway.

Conversely, the private key $K_{pr}$ is known to the smart card only, while being also available to the management system SP. Those keys make it possible to authenticate the smart card on the access gateway AG by means of a digital signature mechanism. Only if the smart card is a valid one, that is one generated by the management system SP, the access gateway firmware authorizes reading and loading the configuration from the smart card, thereby enabling physical connection on the WAN side.

These keys can be used also for other purposes, for instance "strong" authentication in the network.

The symmetric key $K_s$ is generated by -the management system SP starting from the serial number of the smart card. It is therefore unique for each card. It permits all the data present on the smart card to be written and read by the management system SP.

Preferably, this key is never used directly in the write procedure and, therefore, is not stored in the access gateway AG. Preferably, the temporary key is generated and used only for given write session between the access gateway AG and the smart card SC.

The second symmetrical key is generated by the access gateway firmware starting from the smart card serial number. It enables data to be read from the smart card into the access gateway AG. During the read procedure, the access gateway firmware generates, starting from the key $K_1$ a temporary key, that is valid only for that read session. Even if possibly detected (for instance via firmware inspection), this permits data to be read from that specific smart card only.

Figure 4:
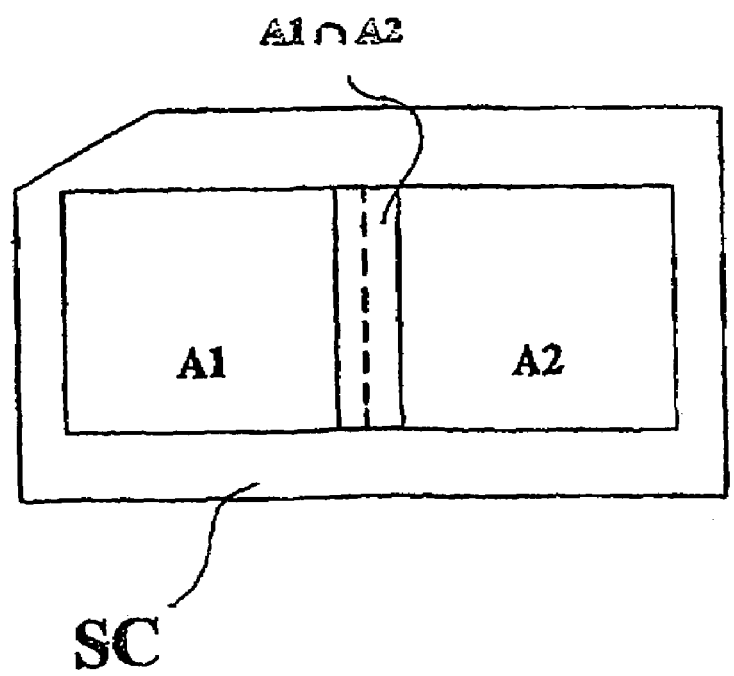

FIG. 4 shows a preferred choice for the access codes to the smart card.

According to that choice, a first code PIN1 is provided that, once verified, enables read and write functions of data with respect to the memory area A2. This code therefore authenticates the card user.

A second code, PIN2, is essentially an access code for the management system SP. Once verified, the access code PIN2 enables access to the card and subsequent writing of data in conformity with the authorizations provided by the $K_s$.

Figure 6:
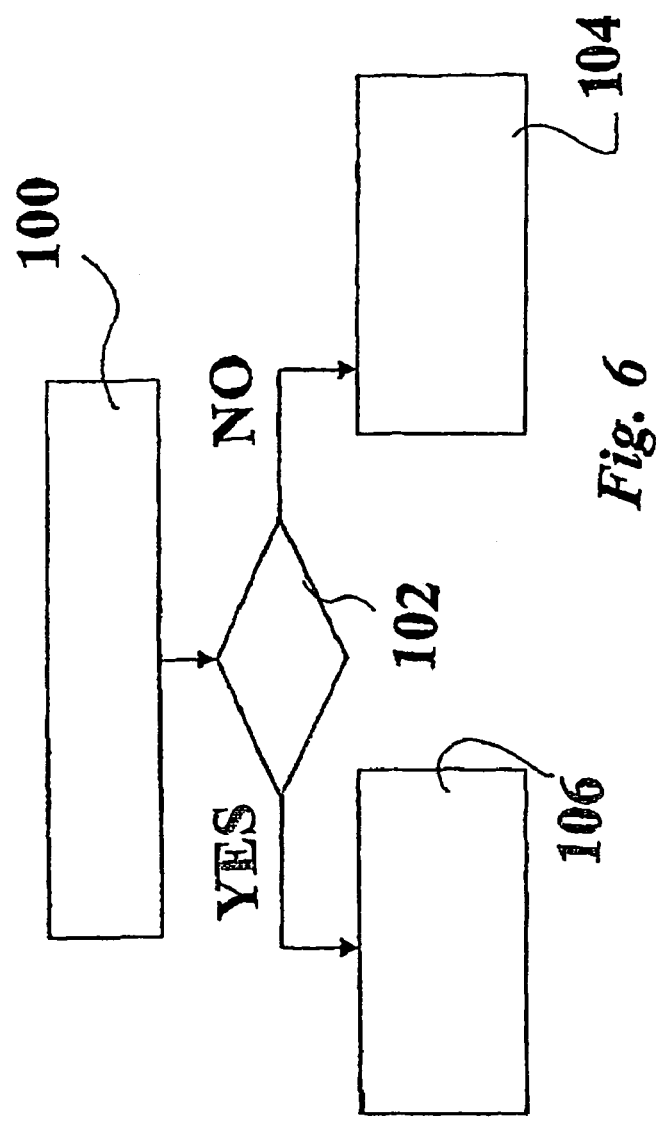
FIG. 6 is a flow chart corresponding to the schematic representation of FIG. 5.
Figure 5:
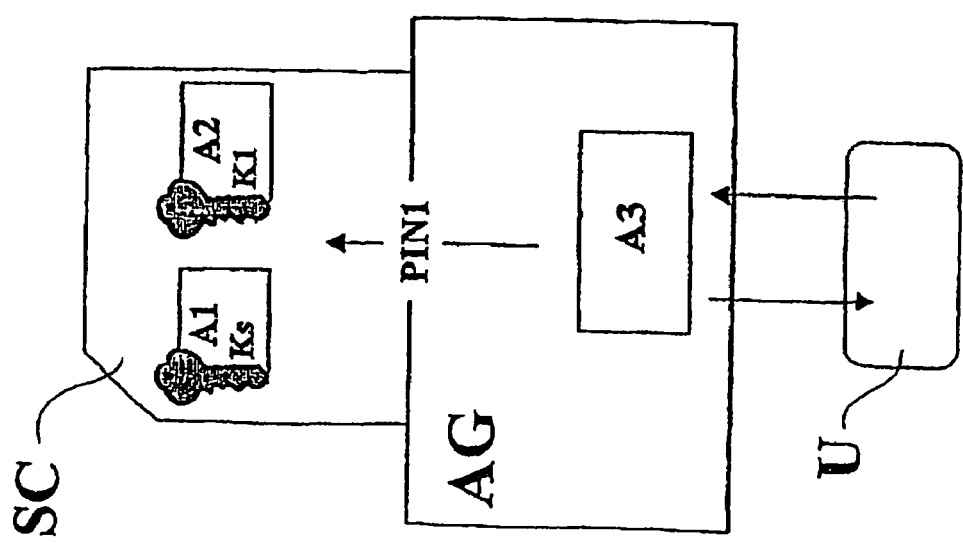
FIG. 5 is a schematic representation of how data are read from the smart card to the access gateway.

The data read process from the smart card SC into the access gateway AG is jointly represented by FIG. 5 and 6.

In first step 100, the user types the first code PIN1 corresponding to a gateway interface (such as a smart card reader) to be authenticated in using the smart card.

In step 102 the system checks the validity of the input code.

In the case of a negative outcome, further reading of the smart card SC is blocked (step 104). Conversely, if the PIN1 code is found to be valid, in step 106 the smart card SC is read and the authentication procedure is activated.

The authentication procedure is detailed in FIGS. 7 and 8.

It will be appreciated that the authentication method described provide for the use of asymmetric keys, which permits use of the smart card only in connection with access gateway products authorized by the management system SP. In fact, only such access gateway products include firmware adapted for reading the public key and authenticating on the smart card and another smart card cannot be used since the private key $K_{pr}$ is not known.

By referring specifically to the flow chart of FIG. 8, in step 110, the access gateway AG reads the certified $K_{pub}$ from the smart card SC and verifies the validity thereof.

Subsequently, in step 112, the access gateway AG generates a random sequence of data for authentication purposes and sends those data to the smart card.

In step 114, the smart card SC "signs" the authentication sequence with the key $K_{pr}$ and re-sends. the result to the access gateway AG.

In step 116, the access gateway re-extracts the authentication sequence by means of $K_{pub}$.

In step 118, the authentication sequence thus re-extracted is compared with the original sequence generated by the access gateway.

If the result of comparison is negative, in step 120 reading of data from the smart card SC is blocked. Also, use of the access gateway AG for WAN access is prevented, while the LAN interface functions are usually preserved.

Conversely, in the case of a positive outcome of the comparison step 118, in a step 122 the system accepts the data received from the smart card and in a step 124 the system checks whether the smart card SC has been already initialised.

In the negative, the provisioning process is started in step 126.

If the smart card is found to be ready initialised, in a step 128 the configuration is read from the smart card and physical connection with the WAN is activated.

Figure 10:
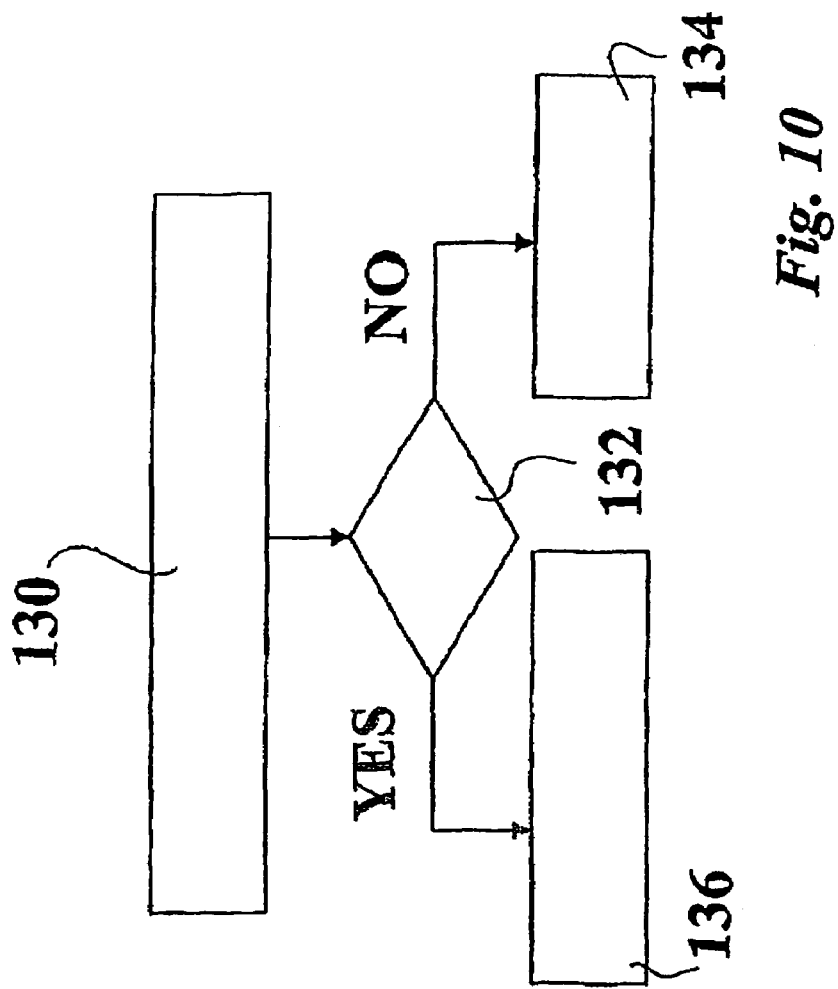
FIG. 10 is a flow chart corresponding to the schematic representation of FIG. 9.
Figure 9:
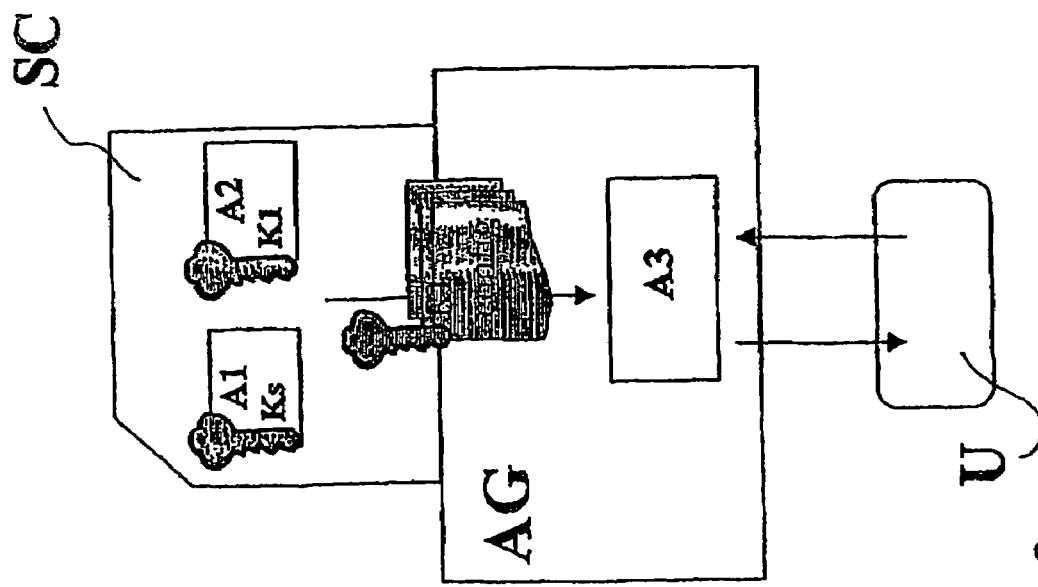
FIG. 9 is a schematic representation of how data are read from an initialised smart card.

The diagrams of FIGS. 9 and 10 detail the process for reading data from an initialised smart card SC.

In a step 130, the access gateway AG reads data from the smart card SC and validates the authenticity thereof by means of the key K1.

Specifically, the data are checked for authenticity in a step 132 and, in the case of a negative outcome thereof, reading of data from the smart card SC is blocked. Also, use of the access gateway AG for WAN access is prevented, while the LAN interface functions are usually preserved. This occurs in a designated step 134.

If, conversely, the outcome of step 132 is a positive one, in a step 136 the system accepts the data from the smart card SC and copies the configuration on the access gateway AG.

This procedure for reading data from the smart card SC into the access gateway AG is used also in the case the configuration is restored on a new access gateway following a failure.

The diagrams of FIGS. 11 and 12 detail the so-called provisioning phase, namely reading of data from non-initialised smart card SC.

In step 138, the access gateway AG enables the connection to the WAN by activating a connection towards a management server. This occurs by resorting to the pre-configured data stored in the memory area A0 of the smart card SC.

Subsequently, in a step 140, the server recognizes the smart card by its serial number. The server identifies the user data and the "anagraphical" data (type of subscription, and so on) associated therewith, for instance, at the purchase/procurement stage.

In a step 142, the user configuration (for the WAN parameters) is written by the management system SP in the memory area A1 of the smart card SC. A flag is set in the smart card to indicate that the smart card was initialised.

In a subsequent step 144, the access gateway discontinues the previous WAN connection and re-establishes it by using the new parameters present in the area A1.

At this point, in a step designated 146, the user proceed with configuration of the LAN parameters. This may occur autonomously or by resorting to remote management by the system provider via the management system SP.

FIGS. 13 and 14 detail the write process of data and the smart card SC by the user.

In a preferred embodiment of the described arrangement, modifications by the user U are subject to control for each single parameter. For those parameters that cannot be modified, a default value present in the area A1 is re-established. At the end of the update phase, the access gateway firmware copies the contents of the memory area A2 in the memory area A3. Only those modifications that are recognised as authorized modifications are actually implemented and rendered operative.

More in detail, reference 150 designates a step wherein the user modifies the configuration parameters on the access gateway. These data are saved in the memory area A3.

In step 152, by using the key $K_s$, the firmware checks, for each parameter that has been modified, whether such modifications are permitted. This occurs in step 152 by accessing the area A1.

Specifically, in a verification step 154, a parameter attempted to be modified is found to be one the user is not authorized to modify. In a subsequent step 156 the modification sought is negated and a default value is re-established.

Conversely, if in the step 154 the modification sought is found to be admissible, in a step 158 a new, modified value is written in the area A2 of the smart card SC.

As indicated, modifications by the user U are preferably subject to control for each single parameter, and the confirmation procedure just described is thus repeated for each parameter sought to be modified.

Finally, FIGS. 15 and 16 detail the data write operation on the smart card SC controlled by the management system SP.

In the preferred embodiment of the arrangement described herein, the management system SP is entitled to modify any information present on the smart card (with the possible exception of the system files). Consequently, the management system SP may also act on the configuration parameters of the user by simplifying configuration and installation of the access gateway AG. When writing parameters on the smart card Sc is completed, the memory area A2 is copied into the area A3, and a temporary key $K_{temp}$ used for that purpose is released. In that way, such a key, even though possibly detected, cannot be used again.

More in detail, in step 160, preferably via a secure remote connection, the management system SP sends the new configuration data to the access gateway AG together with the key $K_s$, with the direction of that such a key must be written into the smart card SC.

In a subsequent step 162, the access gateway firmware negotiates with the smart card SC a temporary key (generated from $K_s$) for the write session.

Then, in a step 164, the access gateway firmware sends the write request to the smart card SC by using the temporary key $K_{temp}$, by verifying authenticity for each parameter.

Validity of authentication is checked in a subsequent step 166.

In the case of a negative outcome, the requested modification of the configuration is negated in the step 168.

If, conversely, the authentication is found to be valid in the step 166, in step 170 the smart card accepts the new parameter.

As indicated, modifications are preferably subject to control for each single parameter, and the confirmation procedure just described is thus repeated for each parameter sought to be modified.

The representation of memory areas A1 and A2 on the smart card SC as shown in FIG. 3 highlights that the respective arrangement (with memory area A1 having stored therein the WAN access data of the management system and A2 having stored therein the user configuration data) ensures that all the information necessary and sufficient for restoring the configuration in the case of an access gateway failure are present on the smart card.

A new access gateway, wherein a new, already configured smart card is inserted, recognises this smart card as an already initialised one. As a consequence, the new access gateway is in position to perform a self-configuration process on the basis of the data read from the smart card.

In such a way, the user may restore—in thoroughly automatic way—the previous configuration. This also applies to possible personalisation previously implemented on the home network interfaces (LAN, WAN, PLC, and so on). The WAN access data being present on the smart card also permits the so-called "nomadism" by the user. The access gateway recognises that an initialised smart card not previously associated to it was inserted. Consequently, only the WAN parameters are used for enabling WAN access.

It will be appreciated that such an arrangement offers a complete back-up function also in connection with the user data.

FIG. 3 highlights that the use, on the smart card SC, of asymmetric keys $K_{pub}$ and $K_{pr}$ permits verification and authentication between the smart card SC and the access gateway AG. The physical WAN connection is enabled only in the case of a positive outcome of verification. In that way, in the absence of the authenticated smart card SC, the access gateway prevents the WAN connection from being used. In that way, the user also retains control over the use of the Internet connection (for instance for parental control purposes).

In the absence of the smart card SC, the access gateway AG ensures however operation of the home network, in that the user's configuration parameters (residing on the memory area A2) are copied into the memory area A3 resident on the access gateway. Consequently, control of the WAN connection via the smart card is ensured, while permitting operation of the home network—also in the absence—of the smart card.

Also, the smart card SC contains (in the memory area A1, that cannot be modified by the user) the user ID and the password for enabling the logical WAN connection (for instance, setting up of the PPP session). The user/password information is stored in an encrypted manner, thus preventing the user from re-utilizing them on any access product.

The logical connection becomes operative only "downstream" of authenticity verification of the smart card and enabling the WAN physical connection.

The arrangement may be rendered even more secure by using so-called strong authentication. In fact, even though encrypted, the user/password information could be possibly detected if utilized in connection with protocols such as PAP/CHAP.

By resorting to a "strong" authentication method certificates are changed via EAP/TLS protocol, between the smart card and the authentication system (for instance a Radius server) in order to enable logical access to the connection. In that way, logical access to the WAN connection is protected against improper use by the user.

In practical terms, the smart card is provided to the user/client together with the access gateway product. The smart card is associated (via the back-office tools of the service provider) to the service profile of the user upon purchase of the product or on the occasion of the first access to the service. The smart card has a basic configuration that is identical for all clients, ensuring the first access to the service provider network to obtain a personalization of the smart card.

Upon inserting the smart card into the access gateway, and after verification of the client as a client authorized to use it (which may occur, for instance, through the request of a PIN code), the network recognises the smart card SC and personalizes it with the client profile data. This occurs by writing on the smart card the necessary parameters such as, for instance, enabling and configuring specific services or access gateway functions.

At this point the client can complete the configuration, for instance by inserting the LAN parameters that are written on the smart card SG. Data are written on the smart card even after the first access to the service in the case of any changes to the configuration of the access gateway AG implemented by either the network or the client. As a consequence, the smart card will always contain an update configuration of the access gateway. Such a feature permits, in the case of a possible failure of the access gateway, to use the same smart card on another access gateway to automatically restore the service and the client configuration without manual re-configuration being required.

Availability of the smart card is a necessary requirement for enabling the WAN connection. In the absence of the smart card, the WAN connection is physically released, while the LAN interfaces and the functions associated therewith are maintained and still available.

The write privileges on the smart card are divided in such a way as to separate the parameters that may be modified by the client from those parameters intended to be left to the control of the service provider. In general terms, the service provider may modify, via the management system SP, any information present on the smart card, thus being in a position to act also on the client's configuration parameters. This may occur also in the form of remote-control function.

Remote management of the access gateway AG and read/write operations of the information present on the smart card by the management system SP is performed in a secure way, thanks to authentication mechanisms acting mutually between the management system, the access gateway and the smart card.

As explained, those mechanisms are based on two secret keys that are unique for each smart card SC.

The first secret key is used by the access gateway AG during the read phase to authenticate the data the access gateway receives from the smart card.

The second key is similarly secret and used by the smart card SC to authenticate the management system and each single write message received therefrom.

While the first key is known to the access gateway firmware, the second is not. Consequently, it cannot be accessed to by inspecting the firmware code. In that way detection of the read key possibly obtained (with great difficulty) by a hacker would not give the possibility of deriving the write key.

In addition thereto, the smart card also uses a pair of public/private asymmetric keys. The two keys are stored in the smart card. The public key may be read from outside, while the private key is not. The public key is known to the access gateway AG firmware that utilises it to authenticate the smart card by means of a digital signature system. The access gateway sends a data sequence to the smart card requesting signature thereof by means of the private key. The smart card re-sends the signed data by permitting the access gateway to determine authenticity of the smart card itself. As an alternative to this mechanism, the smart card may be authenticated by means of the first secret key by resorting to challenge/response type protocol. In this latter case it has the advantage of simplifying at the extents of security.

It is also worth mentioning that, through firmware authentication systems, it is possible to prevent modification thereof by non-authorized entities. In that way the authentication mechanisms and the respective keys are also protected against possible alteration/tampering.

Of course, without prejudice to the underlying principle of the invention, the details and embodiments may vary, also significantly, with respect to what has been described and shown by way of example only, without thereby departing from the scope of the invention as defined by the annexed claims.

This applies, for instance, to the memory areas A0, A1, A2 provided on the smart card SC. Presenting such storage areas as independent areas is evidently intended to indicate that such memory storage areas retain the capability of being accessed distinctly. This, however, does in no way require by way of necessity that such as memory areas are physically separate from each other. Such memory areas may in fact be implemented in the form of distinctly addressable neighbouring storage locations within the framework of a single memory unit, while preserving independent operational characteristics.

The invention claimed is:

1. A method of operating via a smart card and under the control of a management system an access gateway between a local area network and a wide area network, comprising the steps of:
   providing in said smart card at least a first memory area containing configuration data for access to said wide area network that cannot be modified by a user of said local area network and a second memory area designated for storing personalized configuration data provided by the user of said local area network; and
   copying the stored personalized configuration data provided by the user of said local area network from said second memory area into a third memory area resident on said access gateway, the copied personalized configuration data remaining resident in said third memory area when said smart card is removed from said access gateway to enable the operation of said local area network in the absence of said smart card.

2. The method of claim 1, comprising the step of conveying via said access gateway all interactions between said management system and said smart card.

3. The method of claim 2, comprising the step of conveying all interactions between said management system and said smart card via firmware provided in said access gateway.

4. The method of claim 1, further comprising the step of causing said access gateway to permit operation of said local area network when said smart card is removed from said access gateway.

5. A system for operating an access gateway between a local area network and a wide area network, the system comprising at least one user of said local area network's smart card and a management system, comprising:

a smart card including at least a first memory area containing configuration data for access to said wide area network, that cannot be modified by the user of said local area network and a second memory area, adapted for storing personalized configuration data provided by the user of said local area network; and an access gateway including a third memory area for storing the data of said second memory area in said smart card in said third memory area wherein the stored personalized configuration data provided by the user of the local area network is copied from said second memory area into said third memory area, the copied personalized configuration data remaining resident in said third memory area when said smart card is removed from said access gateway to enable the operation of said local area network in the absence of said smart card.

6. The system of claim 5, wherein all interactions between said management system and said smart card are conveyed via said access gateway.

7. The system of claim 6, wherein all interactions between said management system and said smart card are conveyed via firmware provided in said access gateway.

8. The system of claim 5, wherein said access gateway is configured for permitting operation of said local area network when said smart card is removed from said access gateway.

9. A computer-readable storage medium storing instructions for execution by a processor, the instructions when executed by a processor performing a method of operating via a smart card and under the control of a management system an access gateway between a local area network and a wide area network, the method executed by the set of instructions comprising:

providing configuration data for access to said wide area network that cannot be modified by a user of said local area network in a first memory area on the smart card;

receiving personalized configuration data provided by the user of said local area network in a second memory area on the smart card;

copying the stored personalized configuration data provided by the user of said local area network from said second memory area into a third memory area resident on said access gateway, the copied personalized configuration data remaining resident in said third memory area when said smart card is removed from said access gateway to enable the operation of said local area network in the absence of said smart card.

10. The computer-readable medium of claim 9, the method further comprising:

conveying via said access gateway all interactions between said management system and said smart card.

11. The computer-readable medium of claim 9, the method further comprising:

causing said access gateway to permit operation of said local area network when said smart card is removed from said access gateway.

* * * * *

UNITED STATES PATENT AND TRADEMARK OFFICE
CERTIFICATE OF CORRECTION

PATENT NO. : 7,530,101 B2 Page 1 of 1
APPLICATION NO. : 10/546011
DATED : May 5, 2009
INVENTOR(S) : Gallo et al.

It is certified that error appears in the above-identified patent and that said Letters Patent is hereby corrected as shown below:

Claim 9, column 12, line 10, after "network", insert --for access to said local area network--.

Signed and Sealed this

Twentieth Day of October, 2009

David J. Kappos
*Director of the United States Patent and Trademark Office*